United States Patent [19]

Veeze

[11] Patent Number: 4,531,296

[45] Date of Patent: Jul. 30, 1985

[54] DEVICE FOR MARKING OUT WORKPIECES

[75] Inventor: Christiaan E. Veeze, Ede, Netherlands

[73] Assignee: Sociaal Werkvoorzieningschap Zuidwest-Veluwe, Ede, Netherlands

[21] Appl. No.: 463,888

[22] PCT Filed: Jun. 2, 1982

[86] PCT No.: PCT/NL82/00019

§ 371 Date: Jan. 26, 1983

§ 102(e) Date: Jan. 26, 1983

[87] PCT Pub. No.: WO82/04217

PCT Pub. Date: Dec. 9, 1982

[30] Foreign Application Priority Data

Jun. 2, 1981 [NL] Netherlands ........................ 8102674

[51] Int. Cl.[3] ........................ G01B 5/14; B43L 13/02

[52] U.S. Cl. ........................................ 33/189; 33/43; 33/468

[58] Field of Search .................. 33/32 B, 42, 43, 189, 33/437, 468, 469, 470

[56] References Cited

U.S. PATENT DOCUMENTS

| | | | |
|---|---|---|---|
| 845,009 | 2/1907 | Novak | 33/469 |
| 964,785 | 7/1910 | Johnson | 33/43 |
| 1,045,695 | 11/1912 | Goldwater | 33/468 |
| 1,566,509 | 12/1925 | Schwanz | 33/189 |
| 2,592,877 | 4/1952 | Ellington | 33/189 |
| 2,619,730 | 12/1952 | Carter | 33/189 |
| 3,284,911 | 11/1966 | Clark | 33/43 |

FOREIGN PATENT DOCUMENTS

| | | | |
|---|---|---|---|
| 460914 | 6/1928 | Fed. Rep. of Germany . | |
| 914329 | 7/1954 | Fed. Rep. of Germany . | |
| 1169684 | 3/1964 | Fed. Rep. of Germany | 33/189 |
| 2289877 | 5/1976 | France . | |

*Primary Examiner*—Richard R. Stearns

*Attorney, Agent, or Firm*—Dennison, Meserole, Pollack & Scheiner

[57] ABSTRACT

Marking out device having a sliding block for sliding along the outer edge of a workpiece with a vertical wall resting against the outer edge of the workpiece. A graduated horizontal guider is secured at one end to the upper side of the sliding block and extends laterally therefrom. A holder with a vertical through bore for clamping a pin-shaped marking out member is displaceable along said guider starting from a zero-position of the graduation in which position the axis of the bore lies in the plane of the inner surface of the vertical wall of the sliding block.

4 Claims, 4 Drawing Figures

DEVICE FOR MARKING OUT WORKPIECES

The invention relates to a device for marking out workpieces.

Until now a usual method for marking out for example holes in for example I-beams involved measuring out the planned location of the holes in the web of the I-beam by means of a measuring tape, folding rule or the like and marking out this location on a flange of the I-beam, marking out the lines on which the holes have to be applied by means of a block square and a drawing point and further determining the location of the four holes on these lines by means of a measuring tape or a folding rule and marking this location with a center point. This method often gives rise to inaccuracies. For example with in particular wide I-beam there are created deviations in that the block square is placed against or above round edges of the beam. With narrower I-beams the space, to work in, plays a part. If the block square has been placed in a proper way, there are still possible deviations in that the drawing point with which the work piece is marked out is more or less tilted. With the measuring out and marking out of holes by means of a folding rule, all kinds of deviations are possible for reason such as more or less tilting of the drawing point, round edges of the I-beam, and lack of space, for example because the folding rule is longer than the width of the web of the I-beam.

The invention has as an object to provide a device for marking out workpieces with the above disadvantages eliminated. According to the invention this object is attained by a device comprising a sliding block provided with means for guiding thereof along the outer edge of the workpiece to be marked out with a vertical wall adapted to rest against the outer edge of the workpiece. A graduated horizontal bar-shaped guider is attached with one end to said sliding block at the upper side thereof and extends laterally therefrom, the device further comprising a holder for a pin-shaped marking out member. The holder is displaceable longitudinally of the bar-shaped guider from a starting position near the sliding block, corresponding with the zero-position of the graduation, the holder being provided with a vertical through bore for receiving and clamping a stiff-shaped marking out member so that in the said starting position the axis of the bore is lying in the plane of the inner surface of the vertical wall of the sliding block.

When working with the device according to the invention the round edges of for example I-beam to be marked out do not cause troubles because the sliding block is resting with its vertical wall against the outer edge of the workpiece and thus the position of said sliding block is determined univocally. Because in the starting position the axis of the bore in which a drawing point can be received is coincident with the inner surface of the vertical wall of the sliding block resting against the outer wall, the zero-position of the drawing point is determined univocally and the location to be measured out from that position of for example holes does not show deviations. Because the drawing point always is held in a vertical position in the vertical bore of the holder no deviations can be created by tilting of the drawing point. The space within which the work is to be done cannot play a part because the bar-shaped guider is extending along the upper side of the I-beam.

Of to an embodiment of a device according to the invention the holder for the member, which can consist of a drawing point or a center point or a combination thereof, is mounted to the guider which is secured to the sliding block. Thus the holder can be displaced along the bar-shaped guider. For marking out of for example holes the location of the holes in the web of the I-beam may be for example first measured longitudinally of the I-beam by means of a measuring tape after which the drawing point/center point will be placed at the measured location and the sliding block of the marking out device placed on one of the flanges of the I-beam. The proper location of the hole can be measured out through the graduation of the bar-shaped guider and can be centered by means of the center point.

Another possibility for marking out of holes can be achieved when, in the starting position of the holder the axis of the vertical bore lies in the central cross sectional plane of the sliding block. For measuring out the location of the holes the length of the sliding block will be taken into account. The distance where the holes have to be formed is increased or decreased by half the length of the sliding block which distance then is marked out on a flange of the I-beam and the sliding block is the placed with one of its ends on the marked out location.

An alternate embodiment of the device according to the invention involves the holder of the pin-shaped member attached to and displaceable longitudinally of a second graduated horizontal bar-shaped guider, which guider is perpendicular to the first guider and extends to both sides thereof, said second guider being displaceable longitudinally of the first guider from a starting position, in which the axis of the vertical bore of the holder is lying in the plane of the inner surface of the vertical side wall of the sliding block. With this device it is possible to determine directly the distance in longitudinal direction of the I-beam through the second bar-shaped guider and to mark the location of the holes with the center point.

An efficient embodiment is obtained in that the graduation of the second bar-shaped guider contains a zero position between the ends of this guider so that, if the holder is in this position the axis of the vertical bore thereof is lying in the cross sectional plane through the center of the sliding block. With this device the same working can be done as with the device in which the holder of the pin-shaped member is directly mounted to the bar-shaped guider which is secured to the sliding block moreover, the distance longitudinally of the I-beam can be determined directly through the second bar-shaped guider.

A very efficient embodiment of the device according to the invention is obtained in that the bar-shaped guider attached to the sliding block is articulated about a vertical shaft which is positioned so that the axis thereof is coincident with the axis of the vertical bore of the holder if the latter is in the zero position along the bar-shaped guider. With this device it is for example possible to cut-off angularly an I-beam. Moreover it is possible to position for example polygonal holes in the I-beam. In doing so it is preferred to use a protractor and according to the invention this can be attained in that the bar-shaped guider is secured to a plate which is secured to the upper side of the siding block which has a protractor defined thereon.

In the following the invention will be explained further with reference to the drawings which show by way of example some embodiments of the device according to the invention as well as some examples of the way in which these devices can be worked.

Figure 1:
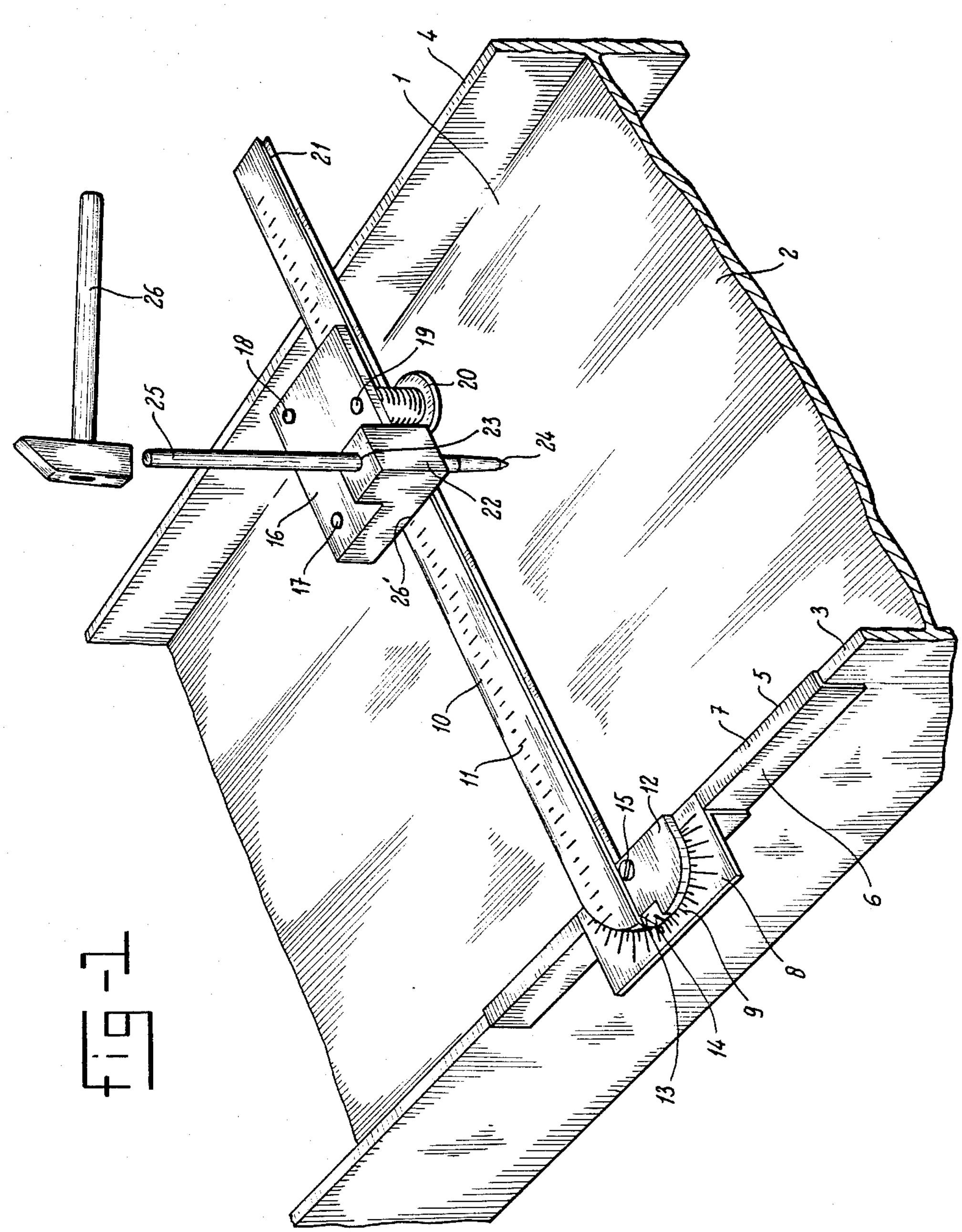
FIG. 1 shows a perspective elevation of an embodiment according to the invention, placed on a I-beam to be marked out.

In FIG. 1 an I-beam 1 is shown with a web 2 and the flanges 3 and 4. On the flange 3 the sliding block of the device according to the invention is placed, which sliding block has a vertical wall 6 resting against the flange 3 and a flanged edge 7 lying upon the edge of the flange 3. Further the sliding block 5 is provided with an outwardly projecting horizontal plate 8 provided with a protractor 9 with a graduation from 0° up to 180°. A bar-shaped guider 10 is secured to the upper side of the plate 8 which guider is provided with a graduation 11 in centimeters and millimeters. For securing the bar 10 to the plate 8 said bar 10 is provided at one end with an integrated plate shaped portion 12, of which a portion of the circumference is half-circular which half-circular portion in the center thereof is provided with a recess 13 provided with a mark line 14 cooperating with the protractor 9. Plate 12 is secured to the plate 8 by a screw 15, the plate 12 may articulate about said screw if the screw is loosened. The articulating screw or shaft is applied at such a way that the axis thereof is in the plane of the inner surface of the vertical wall 6, said axis also lying in the cross sectional plane of the block 5 extending through the center thereof. The barshaped guider 10 is provided with a carriage 16, which is mounted to three vertical shafts 17, 18 and 19, said shafts being provided at the lower ends thereof with three rotatable guiding wheels, of which one, 20, is visible. The guiding wheels engage grooves along both sides of the guiding bar and extending longitudinal thereof, one of said grooves being visible and indicated with the reference number 21 in the drawings. The carriage 16 is provided at one side edge with a body 22 of resilient plastic material which body is provided with a vertical bore 23 in which bore is received a pin 25 provided with a hardened point 24, said pin can be a drawing point or a center point or a combination thereof. The inner diameter of the bore is such that the pin 25 is fitted in a clamped manner therein. The vertical bore 23 has been located in such a way that in the position in which the side 26' of the carriage 16, cooperating with the graduation, is in the zero position of the graduation 11, the axis of the bore coincides with the axis of the screw 15 and thus of the articulating shaft of the guider.

Figure 3:
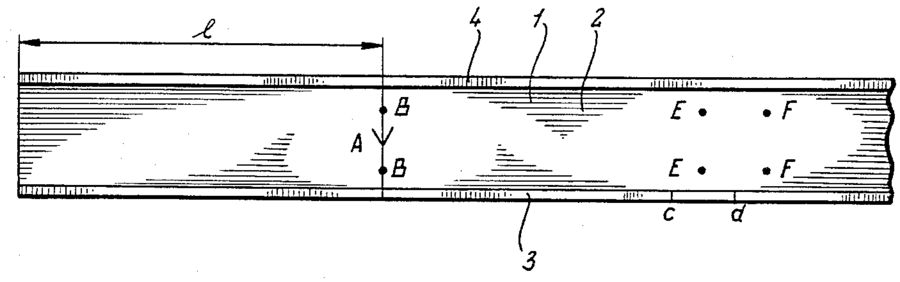
FIG. 3 shows in outline a top view of an I-beam in which are indicated holes to be applied in the beam and marked out with the device according to the invention.

In FIG. 3 is schematically shown the manner in which the marking out device shown in FIG. 1 can be used for marking out holes in a I-beam. In FIG. 3 a top view of the I-beam is shown. The points B—B indicate locations where holes in the web of the I-beam have to be formed. The desired distance 1 on the web of the I-beam is measured by means of a measuring tape and at this distance the point A is for example indicated. After measuring out of the point A the marking out device according to FIG. 1 is used for marking out and centering of the points B, B. For this purpose the bar 10 is locked by means of the screw 15 at an angle of 90° with respect to the block 5. The drawing pin 25 is placed in the bore 23 and the point of this drawing pin is placed at the point A after which the sliding block 5 is placed on the flange 3. By shifting the carriage 16 along the guiding bar a line passing through the points B,B is scratched, after which the carriage 16 is placed at the desired distance on the graduation of the bar and a center point is positioned in the bore, which center point is driven home by means of the hammer 26 (FIG. 1), after which the holder is shifted along the guider to the other of said points B and the center point also is driven home at that point.

In FIG. 3 there are also indicated four points E,E,F,F, the distance between the points E,F being equal to the length of the sliding block 5 of the device according to the invention. A length frequent employed is a length of 200 mm, corresponding with the measure of frequently used sketching plates, to be connected to the I-beam of 200×200 mm. In FIG. 3 the dimension lines c and d are indicated on the edge of the flange 3. The distance c-d is the length (200 mm) of a block of the marking out device. For the marking out of points E—E the line c is marked out on the flange 3 at a distance from the left end of the I-beam corresponding to the distance of this end from the points E—E decreased by 100 mm, i.e. half of the length of the block 5. The block 5 of the marking out device is then applied with its left end (seen in top view) against the line c, after which the points E can be marked out and centered accurately in the way as described above. For marking out of the points F, F, lying at a distance equal to the length of block 5 the line d can be marked out on the flange 3 at the right end (in top view) of the block 5, after which the block 5 with its left end is shifted from a position at the line c until this end is lying against the line d, after which points F, F can be marked out accurately and can be centered in the way as indicated above.

Figure 4:
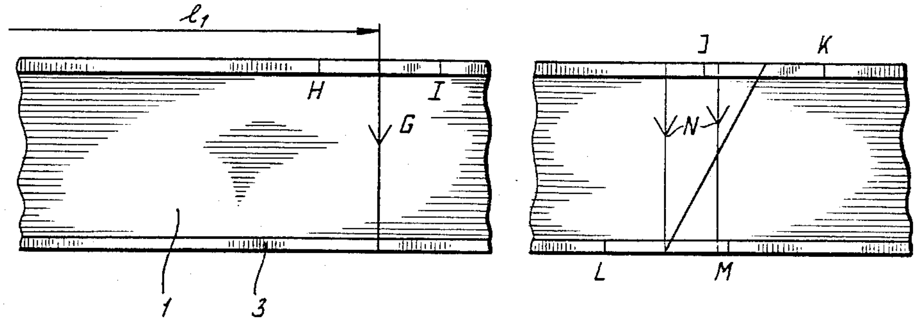
FIG. 4 shows in outline a top view of a I-beam in which are indicated lines for cutting off the I-beam which are marked out with the device according to the invention.

In FIG. 4 a top view of an I-beam is diagrammically indicated, which view is interrupted in the middle thereof. In the left part is indicated the way in which the beam can be cut off rectangularly. For that purpose use is made of the marking out device according to FIG. 1 with the guiding bar placed at an angle of 90° with respect to the block 5. The location where the beam must be cut off is measured out across the web of the beam and the location measured out is indicated by point G. Pin 25 is placed in point G after which the sliding block is placed against flange 3, after which the location where the beam must be cut off is scratched in the web by means of the carriage 16. It is also possible to place the block with one of its ends on the flange of the beam at measured out places H or I as indicated in the figure, which location H or I is the measured out distance plus or minus 100 mm, after which the desired line can be scratched in the way as indicated here above.

In the right part of FIG. 4 is indicated in which way an I-beam can be cut off angularly. For this purpose the screw 15 of the marking out device is loosened by means of a screw driver and the bar-shaped guider adjusted to the number of required grades on the protractor 9. Thereafter the screw is firmly tightened. Thereafter the block can be placed with its end on one of the measured out points J, K, L or M and the desired line can be scratched with the drawing point. Points J, K, L or M may also be obtained for example by transmitting a point N which already is marked out in the middle of the beam to the flanges and to mark out point L or M starting from that point, after which the device can be operated as indicated here above.

Figure 2:
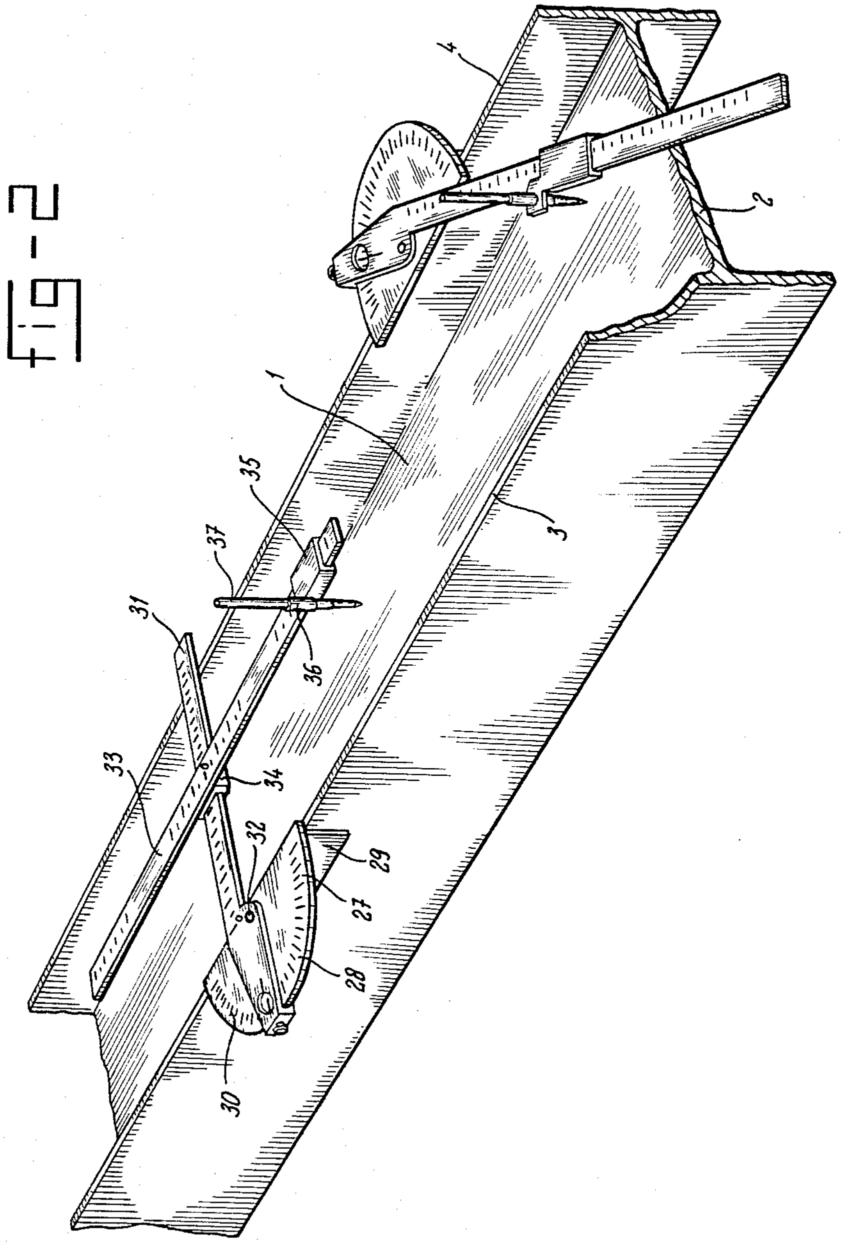
FIG. 2 shows a perspective elevation of an alternate embodiment of the device according to the invention placed on a I-beam to be marked out.

In FIG. 2 an alternate embodiment of the marking out device according to the invention is shown. The marking out device according to this embodiment comprises a sliding block 27 consisting of a half circular horizontal plate 28 at the bottom side of which a vertical plate 29 is mounted, resting against the flange 3. Plate 28 further rests on the edge of the flange 3. The upper side plate 28 is provided with a protractor 30 of 0 to 180°. On plate 28 a graduated guiding bar 31 is attached, which guiding bar is articulating about the shaft 32. Further the device comprises a second guiding bar 33, also graduated, said bar 33 being secured perpendicularly with respect to bar 31 through a sliding blcok 34. A sliding block 35 is mounted on bar 33, which sliding block is provided with a vertical tube 36 in which a drawing point or center point 37 is received. The bar 33 is displaceable along bar 31 through the sliding block 34 from a zero-position on the graduation of bar 31. The tube 36 of the sliding block 35 is applied in such a way that the axis thereof is in the plane of the inner surface of the vertical wall 29 of the sliding block 27 when the guiding bar 33 is in said zero-position of the graduation of bar 31. Moreover the zero-position of the graduation of bar 33 is applied located in such a way that, when the sliding block 35 has been brought in this zero position, the axis of the tube 36 is lying in the cross section plane through the center of the sliding block 27. By means of the guiding bar 33 it is possible, when the sliding block is placed in one determined measured out position on flange 3, to mark out holes from this position by shifting the guider 33 with respect to the guider 31 and by shifting the block 35 along the guider 33. The bars 33 and 31 have exactly the same dimensions so that the block 35 can also be applied directly on the guider 31, by which a device is obtained equal to the device of FIG. 1, such as indicated in the right part of FIG. 2.

The carriage 16 and the sliding blocks 34 and 35 can be provided with locking devices to lock said components in a desired position. Further the carriage and the sliding blocks 34 and 35 can be provided at the side with which they cooperate with the graduations of the guiding bars, with a nonius, by which a very accurate positioning can be obtained.

Further the marking out device can be carried out in various dimensions.

Further the marking out device can be provided with electronic driving which can be controlled by means of a computer or not. Further the sliding block can be provided with a permanent, non-permanent or electric magnet to maintain said sliding block in proper position on the workpiece.

I claim:

1. Device for marking out workpieces, said device comprising a sliding block provided with a vertical wall adapted to rest against the outer side of the workpiece, a graduated horizontal bar-shaped guider being secured with one end to the sliding block and extending laterally therefrom, the device further comprising a holder for a pin-shaped marking out member which is displaceable longitudinally of the bar-shaped guider from a starting position near said sliding block, corresponding to the zeroposition of the graduation, said holder being provided with a vertical through bore for receiving said pin-shaped marking out member, said graduated horizontal bar-shaped guider being secured at the upper side of said sliding block and said veritcal through bore for said pin-shaped marking out member being positioned in said holder so that in said starting position of said holder the axis of said bore is in the plane of the inner surface of the vertical wall of said sliding block, a second graduated horizontal bar-shaped guider, said holder of said pin-shaped member being mounted to said second graduated huorizontal bar-shaped guider and displaceable in the longitudinal direction thereof, said second bar-shaped guider being applied perpendicular to the first guider and extending at both sides thereof, said second guider being displaceable in the longitudinal direction of the first guider from a starting position, in which position the axis of the vertical bore of said holder is lying in the plane of the inner surface of the vertical side wall of said sliding block, the graduation of said second bar-shaped guider comprising a zero-position between the ends of this guider in such a way that, when said holder is in this position, the axis of the vertical bore thereof is lying in the cross section plan through the center of said sliding block.

2. Device according to claim 1 wherein the bar-shaped guider mounted to the sliding block is articulated about a vertical shaft in such a way that the axis of said shaft is coincident with the axis of the vertical bore of said holder if the latter is in the zero-position along said bar-shaped guider.

3. Device according to claim 2 wherein said bar-shaped guider is mounted to a plate which is secured at the upper side of said sliding block, which plate is provided with a protractor.

4. Device for marking out workpieces, said device comprising a sliding block provided with a vertical wall adapted to rest against the outer side of the workpiece, a graduated horizontal bar-shaped guider being secured with one end to the sliding block and extending laterally therefrom, the device further comprising a holder for a pin-shaped marking out member which is displaceable longitudinally of the bar-shaped guider from a starting position near said sliding block, corresponding to the zero-position of the graduation, said holder being provided with a vertical through bore for receiving said pin-shaped marking out member, said graduated horizontal bar-shaped guider being secured at the upper side of said sliding block and said vertical through bore for said pin-shaped marking out member being positioned in said holder so that in said starting position of said holder the axis of said bore is in the plane of the inner surface of the vertical wall of said sliding block, the bar-shaped guider secured to the sliding block being articulated about a vertical shaft in such a way that the axis of said shaft is coincident with the axis of the vertical bore of said holder if the latter is in the zero-position along said bar-shaped guider.

* * * * *